US012341386B2

(12) United States Patent
Harada et al.

(10) Patent No.: US 12,341,386 B2
(45) Date of Patent: Jun. 24, 2025

(54) MANUFACTURING DEVICE FOR ROTOR AND MANUFACTURING METHOD FOR ROTOR

(71) Applicant: DENSO CORPORATION, Kariya (JP)

(72) Inventors: Masaru Harada, Kariya (JP); Ritsurou Hiramatsu, Kariya (JP); Toshihiro Uchida, Kariya (JP)

(73) Assignee: DENSO CORPORATION, Kariya (JP)

( * ) Notice: Subject to any disclaimer, the term of this patent is extended or adjusted under 35 U.S.C. 154(b) by 220 days.

(21) Appl. No.: 17/963,455

(22) Filed: Oct. 11, 2022

(65) Prior Publication Data

US 2023/0032685 A1 Feb. 2, 2023

Related U.S. Application Data

(63) Continuation of application No. PCT/JP2021/021622, filed on Jun. 7, 2021.

(30) Foreign Application Priority Data

Jun. 9, 2020 (JP) ................. 2020-100186

(51) Int. Cl.
*H02K 15/02* (2025.01)
*H02K 1/276* (2022.01)
*H02K 15/03* (2006.01)
*H02K 15/10* (2025.01)
*H02K 21/16* (2006.01)

(52) U.S. Cl.
CPC ........... *H02K 15/03* (2013.01); *H02K 1/2773* (2013.01); *H02K 21/16* (2013.01)

(58) Field of Classification Search
CPC ....... H02K 1/2773; H02K 21/16; H02K 15/03
See application file for complete search history.

(56) References Cited

U.S. PATENT DOCUMENTS 11,923,117 B2 * 3/2024 Avanesov ............. H02K 21/22
11,996,738 B2 * 5/2024 Uchida ................. H02K 15/03
12,131,853 B2 * 10/2024 Harada ................. H01F 13/003
2007/0200464 A1    8/2007 Sakamoto et al.
(Continued)

FOREIGN PATENT DOCUMENTS

JP    H05-010338 Y2    3/1993
JP    2007-267476 A    10/2007
JP    2007-282403 A    10/2007
(Continued)

*Primary Examiner* — Paul D Kim
(74) *Attorney, Agent, or Firm* — Oliff PLC (57) ABSTRACT

A rotor includes a permanent magnet, which is inserted in a magnet receiving hole of a rotor core and is shaped in a form of a mountain fold that is convex toward a radially inner side. A manufacturing device for the rotor includes a magnetizing device that magnetizes the inserted permanent magnet from an outside of the rotor. The magnetizing device includes: a first magnetizing unit that is placed on one side of the rotor in an axial direction and includes a magnetizing coil which supplies a magnetizing magnetic flux to the permanent magnet; and a second magnetizing unit that is placed on another side of the rotor in the axial direction and includes a magnetizing coil which supplies a magnetizing magnetic flux to the permanent magnet.

8 Claims, 9 Drawing Sheets

(56) References Cited

U.S. PATENT DOCUMENTS

2016/0359398 A1 12/2016 Shibata
2017/0279340 A1 9/2017 Takeuchi et al.

FOREIGN PATENT DOCUMENTS

| JP | 2010-193587 A | 9/2010 |
| JP | 2014-121116 A | 6/2014 |
| JP | 2016-100441 A | 5/2016 |
| JP | 2017-060240 A | 3/2017 |

* cited by examiner

MANUFACTURING DEVICE FOR ROTOR AND MANUFACTURING METHOD FOR ROTOR

CROSS REFERENCE TO RELATED APPLICATIONS

This application is a continuation application of International Patent Application No. PCT/JP2021/021622 filed on Jun. 7, 2021, which designated the U.S. and claims the benefit of priority from Japanese Patent Application No. 2020-100186 filed on Jun. 9, 2020. The entire disclosures of all of the above applications are incorporated herein by reference.

TECHNICAL FIELD

The present disclosure relates to a manufacturing device for a rotor, a manufacturing method for the rotor, and the rotor.

BACKGROUND

Previously, there is known a rotary electric machine having a rotor of an interior permanent magnet (IPM) type. The rotor of the interior permanent magnet type includes permanent magnets inserted in a rotor core. This rotor is configured to generate a reluctance torque at outer core portions, each of which is located on a radially outer side of a corresponding one of the permanent magnets, in addition to a magnet torque induced by the permanent magnets. For the rotor of the interior permanent magnet type, there has been proposed a technique of magnetizing unmagnetized permanent magnets, which are inserted in a rotor core, from a radially outer side of the rotor core by using a magnetizing device.

SUMMARY

This section provides a general summary of the disclosure, and is not a comprehensive disclosure of its full scope or all of its features.

According to the present disclosure, there is provided a manufacturing device for a rotor that includes a permanent magnet, which is inserted in a magnet receiving hole of a rotor core and is shaped in a form of a mountain fold that is convex toward a radially inner side. The manufacturing device includes a magnetizing device that is configured to magnetize the permanent magnet, which is inserted in the magnet receiving hole, from an outside of the rotor. The magnetizing device includes: a first magnetizing unit that is placed on one side of the rotor in an axial direction of the rotor and includes a magnetizing coil which is configured to supply a magnetizing magnetic flux to the permanent magnet; and a second magnetizing unit that is placed on another side of the rotor in the axial direction and includes a magnetizing coil which is configured to supply a magnetizing magnetic flux to the permanent magnet.

According to the present disclosure, there is also provided a manufacturing method for a rotor that includes a permanent magnet, which is inserted in a magnet receiving hole of a rotor core and is shaped in a form of a mountain fold that is convex toward a radially inner side. The manufacturing method includes magnetizing the permanent magnet, which is inserted in the magnet receiving hole, from an outside of the rotor by using a magnetizing device. The magnetizing of the permanent magnet includes exciting a corresponding portion of a first magnetizing unit and a corresponding portion of a second magnetizing unit, which are opposed to the rotor in the axial direction.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Previously, there is known a rotary electric machine having a rotor of an interior permanent magnet (IPM) type. The rotor of the interior permanent magnet type includes permanent magnets inserted in a rotor core. This rotor is configured to generate a reluctance torque at outer core portions, each of which is located on a radially outer side of a corresponding one of the permanent magnets, in addition to a magnet torque induced by the permanent magnets. For the rotor of the interior permanent magnet type, there has been proposed a technique of magnetizing unmagnetized permanent magnets, which are inserted in a rotor core, from a radially outer side of the rotor core by using a magnetizing device.

By the way, in order to improve the performance of the rotor of the interior permanent magnet type, each of the permanent magnets may be shaped in a form of a generally V-shaped or U-shaped mountain fold to increase a size of a magnet surface of each permanent magnet and a size of each outer core portion of the rotor core, so that the magnet torque and the reluctance torque are both increased.

When it is desirable to further increase the size of the magnet surface of each permanent magnet and the size of each outer core portion of the rotor core, it is conceivable to more radially inwardly position a bent portion, which is a U-turned portion of the permanent magnet, to increase a depth of the mountain fold of the permanent magnet. When the bent portion of the permanent magnet is more radially inwardly positioned, the bent portion and its vicinity are spaced away from the magnetizing device. Therefore, with respect to the previously proposed magnetizing technique, which magnetizes the permanent magnets from the radially outer side of the rotor core, there is concern about whether the bent portion and its vicinity of the permanent magnet, which are far from the magnetizing device, can be magnetized to have a sufficient magnetic force.

According to a first aspect of the present disclosure, there is provided a manufacturing device for a rotor that includes a permanent magnet, which is inserted in a magnet receiving hole of a rotor core and is shaped in a form of a mountain fold that is convex toward a radially inner side. The manufacturing device includes a magnetizing device that is configured to magnetize the permanent magnet, which is inserted in the magnet receiving hole, from an outside of the rotor. The magnetizing device includes: a first magnetizing unit that is placed on one side of the rotor in an axial direction of the rotor and includes a magnetizing coil which is configured to supply a magnetizing magnetic flux to the permanent magnet; and a second magnetizing unit that is placed on another side of the rotor in the axial direction and includes a magnetizing coil which is configured to supply a magnetizing magnetic flux to the permanent magnet. A corresponding portion of the first magnetizing unit and a corresponding portion of the second magnetizing unit, which are opposed to the rotor in the axial direction, are respectively excited to have a common polarity and thereby to supply the magnetizing magnetic flux, which has the common polarity, from the one side and the another side in the axial direction to a corresponding portion of the rotor core, which is located on an inner side of the mountain fold of the permanent magnet, to magnetize the permanent magnet at a time of magnetizing the permanent magnet through energization of the magnetizing coil of the first magnetizing unit and energization of the magnetizing coil of the second magnetizing unit.

According to a second aspect of the present disclosure, there is provided a manufacturing method for a rotor that includes a permanent magnet, which is inserted in a magnet receiving hole of a rotor core and is shaped in a form of a mountain fold that is convex toward a radially inner side. The manufacturing method includes magnetizing the permanent magnet, which is inserted in the magnet receiving hole, from an outside of the rotor by using a magnetizing device. The magnetizing of the permanent magnet includes: using a first magnetizing unit that is placed on one side of the rotor in an axial direction of the rotor and includes a magnetizing coil which is configured to supply a magnetizing magnetic flux to the permanent magnet; using a second magnetizing unit that is placed on another side of the rotor in the axial direction and includes a magnetizing coil which is configured to supply a magnetizing magnetic flux to the permanent magnet; and exciting a corresponding portion of the first magnetizing unit and a corresponding portion of the second magnetizing unit, which are opposed to the rotor in the axial direction, so that the corresponding portion of the first magnetizing unit and the corresponding portion of the second magnetizing unit have a common polarity and thereby respectively supply the magnetizing magnetic flux, which has the common polarity, from the one side and the another side in the axial direction to a corresponding portion of the rotor core, which is located on an inner side of the mountain fold of the permanent magnet, to magnetize the permanent magnet at a time of magnetizing the permanent magnet through energization of the magnetizing coil of the first magnetizing unit and energization of the magnetizing coil of the second magnetizing unit.

According to the manufacturing device and the manufacturing method for the rotor, at the time of magnetizing the permanent magnet, which is inserted in the rotor, the corresponding portion of the first magnetizing unit and the corresponding portion of the second magnetizing unit, which are opposed to the rotor in the axial direction, are respectively excited to have the common polarity and thereby to supply the magnetizing magnetic flux, which has the common polarity, from the one side and the another side to the corresponding portion of the rotor core, which is located on the inner side of the mountain fold of the permanent magnet, to magnetize the permanent magnet. Therefore, even in the case of the permanent magnet, which is shaped in the form of the mountain fold, the magnetizing magnetic flux, which is suitable for the magnetization, can be supplied to the permanent magnet throughout the entire range of the permanent magnet that is from the radially outer end part to the bent portion located at the radially inner side. Thus, more effective and sufficient magnetization can be performed over the entire permanent magnet.

A rotor, which is magnetized by using the manufacturing device and the manufacturing method, includes: a rotor core; and a permanent magnet, which is inserted in a magnet receiving hole of the rotor core and is shaped in a form of a mountain fold that is convex toward a radially inner side. The permanent magnet, which is inserted in the magnet receiving hole, is magnetized from an outside by using a magnetizing device. The permanent magnet, which is magnetized by supplying a magnetizing magnetic flux of a common polarity from one side and another side of the rotor core in an axial direction to a corresponding portion of the rotor core located on an inner side of the mountain fold of the permanent magnet, forms a block of a magnetizing unit, and the block is one of a plurality of blocks stacked in the axial direction.

In the case where the permanent magnet is magnetized by supplying the magnetizing magnetic flux in the axial direction of the rotor, there is concern about whether a middle portion of the permanent magnet, which is positioned in the middle of the permanent magnet in the axial direction, can be sufficiently magnetized. However, in the above rotor, the permanent magnet forms the block of the magnetizing unit that enables the sufficient magnetization of the permanent magnet, and the plurality of blocks are stacked in the axial direction. Therefore, even in the case of the rotor, which is relatively long in the axial direction, it is possible to provide this rotor as the rotor having the permanent magnets that exert the sufficient magnetic force.

Hereinafter, an embodiment of a manufacturing device for a rotor, a manufacturing method for the rotor and the rotor will be described.

Figure 1:
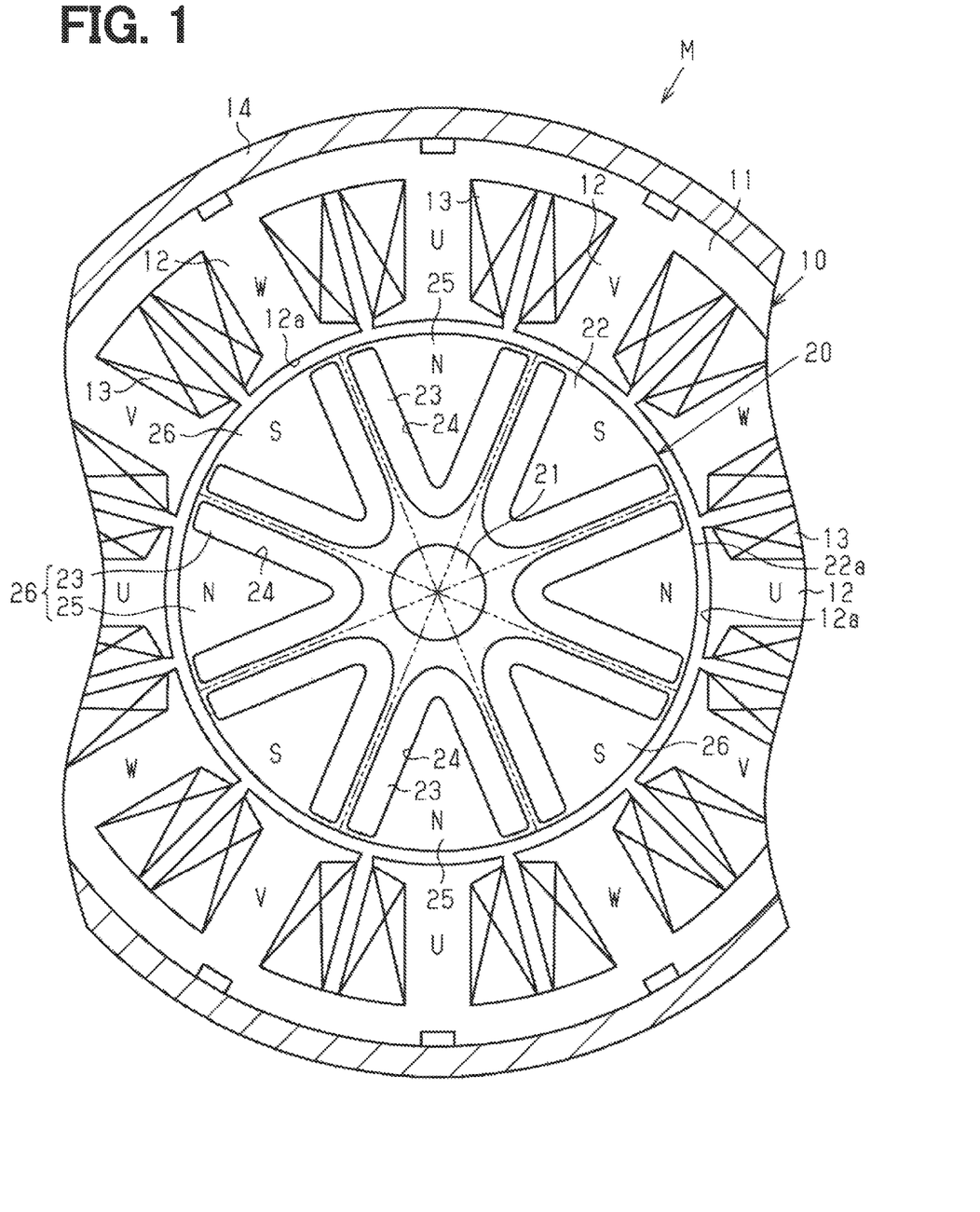
FIG. 1 is a diagram showing a structure of a rotary electric machine having a rotor of an interior permanent magnet type.

A rotary electric machine M of the present embodiment shown in FIG. 1 is constructed as a brushless electric motor of an interior permanent magnet type. The rotary electric machine M includes: a stator 10 which is shaped generally in a circular columnar form; and a rotor 20 which is shaped generally in a cylindrical columnar form and is rotatably installed in a space located on a radially inner side of the stator 10.

The stator 10 includes a stator core 11 shaped generally in a cylindrical columnar form. The stator core 11 is formed by, for example, a plurality of electromagnetic steel plates which are made of a magnetic metal material and are stacked in an axial direction. The stator core 11 has a plurality (twelve in the present embodiment) of teeth 12. The teeth 12 extend radially inward and are arranged at equal intervals in a circumferential direction. The teeth 12 are respectively shaped in an identical form. A distal end portion of each of the teeth 12, which is a radially inner end portion, is shaped generally in a T-form, and a distal end surface 12a of this distal end portion is shaped in an arcuate form that corresponds to an outer peripheral surface of the rotor 20. Windings 13 are respectively wound as a concentrated winding around the teeth 12. The windings 13 are connected in a form of three-phase connection and function as a U-phase winding, a V-phase winding and a W-phase winding, as shown in FIG. 1. When an electric power is supplied to the windings 13, a rotating magnetic field for rotating the rotor 20 is generated at the stator 10. An outer peripheral surface of the stator core 11 of the stator 10 is fixed to an inner peripheral surface of a housing 14.

The rotor 20 includes: a rotatable shaft 21; a rotor core 22 which is shaped generally in a cylindrical columnar form and receives the rotatable shaft 21 at a center of the rotor core 22; and a plurality (eight in the present embodiment) of permanent magnets 23 which are inserted in an inside of the rotor core 22. The rotor core 22 is formed by, for example, a plurality of electromagnetic steel plates which are made of a magnetic metal material and are stacked in the axial direction. The rotatable shaft 21 is supported by bearings (not shown) installed to the housing 14, so that the rotor 20 is arranged to be rotatable relative to the stator 10.

The rotor core 22 has a plurality of magnet receiving holes 24 each of which receives a corresponding one of the permanent magnets 23. The number of the magnet receiving holes 24 is eight in the present embodiment, and these magnet receiving holes 24 are arranged at equal intervals in the circumferential direction of the rotor core 22. The magnet receiving holes 24 are respectively shaped in an identical form that is in a form of a mountain fold which is V-shaped and is convex toward the radially inner side. Each of the magnet receiving holes 24 extends along an entire axial extent of the rotor core 22.

The permanent magnets 23 of the present embodiment are respectively formed by a bond magnet that is formed by molding and solidifying a magnet material, which is a mixture of magnet powder and resin. Specifically, each of the permanent magnets 23 is formed as follows. That is, the magnet material is filled by injection molding into each of the magnet receiving holes 24 of the rotor core 22, which serve as molds, without forming a gap in the magnet receiving hole 24, and thereafter the filled magnet material in each of the magnet receiving holes 24 is solidified to form the permanent magnet 23. Therefore, a hole shape of the magnet receiving hole 24 becomes an outer shape of the permanent magnet 23. As the magnet powder used for the permanent magnets 23 of the present embodiment is powder of samarium-iron-nitrogen (SmFeN) magnet. However, in place of the samarium-iron-nitrogen (SmFeN) magnet, another rare-earth magnet may be used.

Figure 2:
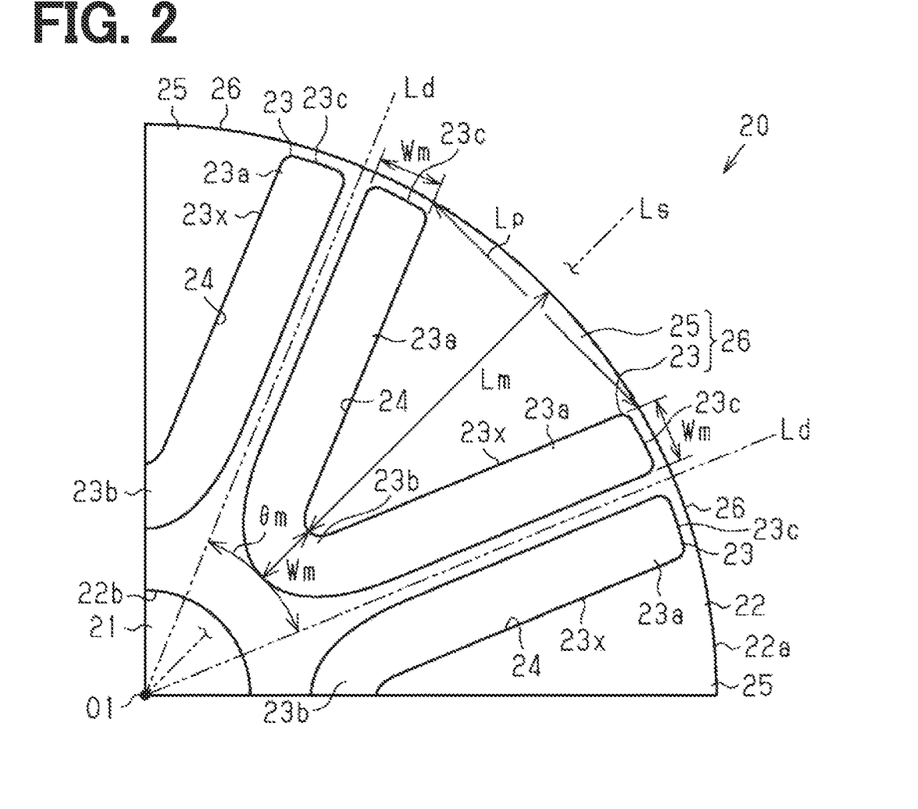
FIG. 2 is a diagram showing a structure of the rotor.

Each of the permanent magnets 23 is shaped in the form of the mountain fold which is V-shaped and is convex toward the radially inner side. Specifically, as shown in FIG. 2, each permanent magnet 23 is shaped such that radially inner end parts of a pair of straight portions 23a are joined together by a bent portion 23b. A radially outer end part 23c of each of the straight portions 23a is placed adjacent to an outer peripheral surface 22a of the rotor core 22. The permanent magnet 23 has a constant thickness Wm at any part of a V-shaped path thereof that includes the pair of straight portions 23a and the bent portion 23b. The permanent magnet 23 is line symmetry with respect to a circumferential center line Ls of the permanent magnet 23 which extends through the central axis O1 of the rotor 20. Furthermore, each adjacent two of the permanent magnets 23 are arranged such that the adjacent permanent magnets 23 are placed adjacent to a magnetic pole boundary line Ld that is located between the adjacent permanent magnets 23 and extends through the central axis O1 of the rotor 20. An angle between each adjacent two of the magnetic pole boundary lines Ld, i.e., a magnetic pole opening angle θm of each rotor magnetic pole portion 26 including the permanent magnet 23 is 180° in electrical angle.

Here, an extension line of an inner surface of one of the straight portions 23a of the V-shaped permanent magnet 23 and an extension line of an inner surface of the other one of straight portions 23a intersect with the outer peripheral surface 22a of the rotor core 22 at two intersections, respectively, and a pitch between these two intersections is defined as a magnetic pole pitch Lp. Furthermore, a length, which is measured from the outer peripheral surface 22a of the rotor core 22 to an inner surface of the bent portion 23b along the circumferential center line Ls of this permanent magnet 23, is defined as an insertion depth Lm. As one example, the permanent magnet 23 of the present embodiment is shaped in the form of the deep mountain fold such that the insertion depth Lm is larger than the magnetic pole pitch Lp. Specifically, a size of a magnet surface 23x of the permanent magnet 23 of the present embodiment, which is formed by the inner surfaces of the pair of straight portions 23a and the inner surface of the bent portion 23b, is set to be larger than a size of a magnet surface (not shown) of a known surface permanent magnet (SPM) type. The shape of the mountain fold of the permanent magnet 23 described above is only the one example and may be changed to any other suitable shape, such as a shape having a shorter insertion depth Lm or a generally U-shape where a size of the bent portion 23b is larger.

Figure 3:
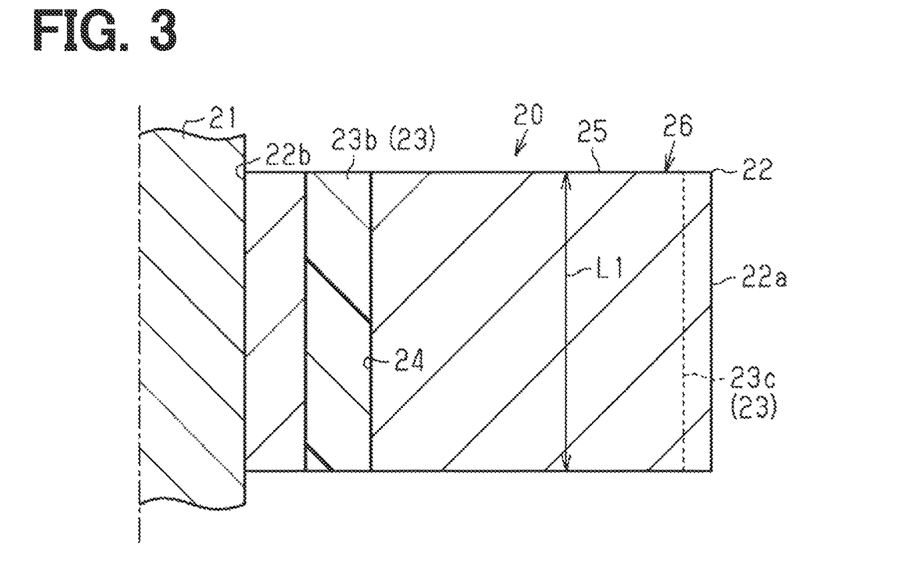
FIG. 3 is a cross-sectional view of the rotor.

Furthermore, as shown in FIGS. 2 and 3, since the insertion depth Lm is set to be relatively large, the bent portion 23b of the permanent magnet 23 is positioned at a radially inner side location that is in close proximity to a shaft fitting hole 22b, which is located at the center of the rotor core 22 and receives the rotatable shaft 21. The permanent magnet 23 extends along the entire axial extent of the rotor core 22. The rotor 20 of the present embodiment has an axial length L1 that is relatively short. Each of the permanent magnets 23 installed in this rotor 20 has an elongated rectangle shape, which is elongated in the radial direction of the rotor 20, when the permanent magnet 23 is laterally viewed from a circumferential side thereof.

Figure 4:
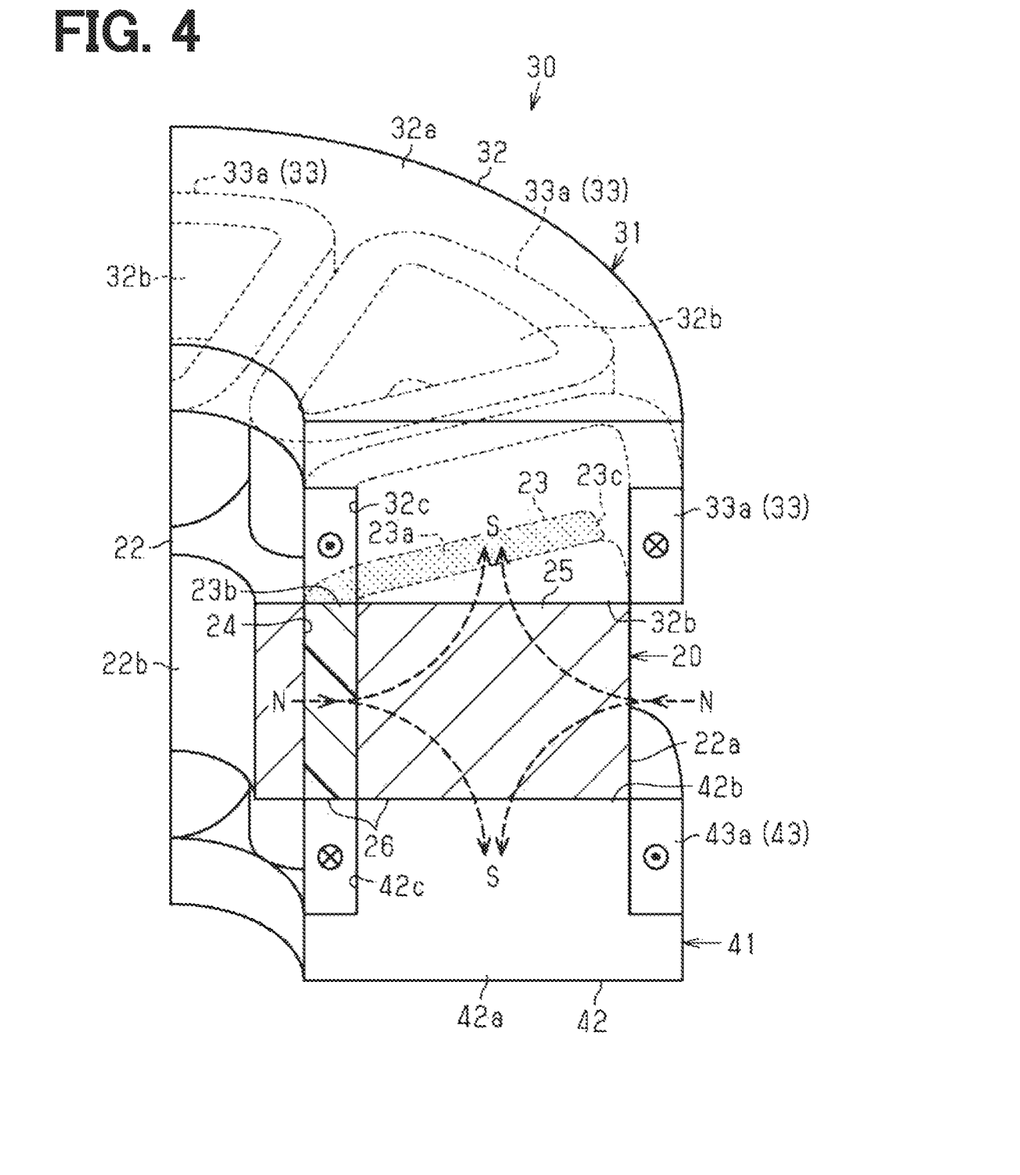
FIG. 4 is an explanatory diagram for explaining an overall structure of a magnetizing device of one embodiment.

Each of the permanent magnets 23, which are respectively solidified in the magnet receiving holes 24 of the rotor core 22, is magnetized from an unmagnetized state to a magnetized state from an outside of the rotor core 22 to function as the magnet by using a magnetizing device 30 shown in, for example, FIG. 4. The magnetizing device 30 and a magnetizing method using the magnetizing device 30 will be described later in detail. The number of the permanent magnets 23, which are arranged in the circumferential direction of the rotor core 22, is eight, and these permanent magnets 23 are magnetized such that the polarities of the permanent magnets 23 are alternately changed in the circumferential direction. Furthermore, each of the permanent magnets 23 is magnetized in a thickness direction of the permanent magnet 23.

Each portion of the rotor core 22, which is located on an inner side of the V-shaped mountain fold of the corresponding one of the permanent magnets 23 in the circumferential direction and is on a radially outer side of the corresponding one of the permanent magnets 23, functions as an outer core portion (a corresponding portion of the rotor core) 25 that is opposed to the stator 10 and is configured to obtain a reluctance torque. Each of the outer core portions 25 is shaped generally in a triangle that has an apex directed toward the center of the rotor 20 in the axial view. In the present embodiment, the rotor 20 is formed to have eight rotor magnetic pole portions 26 that provide eight poles while each of the rotor magnetic pole portions 26 includes the corresponding permanent magnet 23 and the corresponding outer core portion 25 enclosed in the inside of the V-shaped mountain fold of the permanent magnet 23. The rotor magnetic pole portions 26 function as N-poles and S-poles which are alternately arranged in the circumferential direction, as shown in FIG. 1. In the rotor 20 that has the rotor magnetic pole portions 26 described above, a magnet torque and the reluctance torque can be appropriately obtained.

Next, the manufacturing device, which includes the magnetizing device 30, and the manufacturing method of the rotor 20, which include the magnetizing method for magnetizing the permanent magnets 23 using the magnetizing device 30, will be described.

(Structure of Magnetizing Device)

Figure 5:
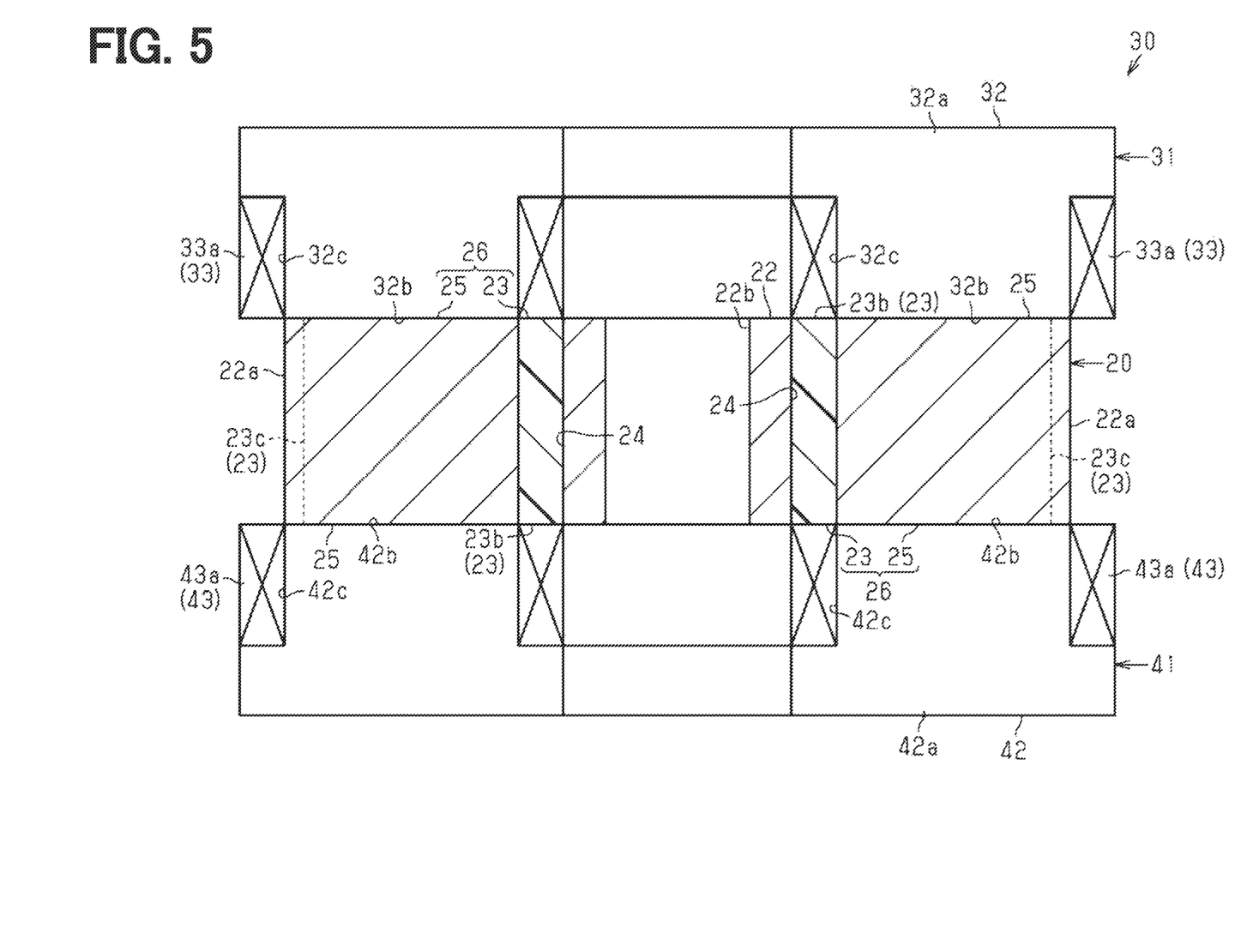
FIG. 5 is an explanatory diagram for explaining the overall structure of the magnetizing device of the one embodiment.

The magnetizing device 30 of the present embodiment will be described with reference to FIGS. 4 and 5. In FIGS. 4 and 5, indication of hatching is appropriately omitted for some cross-sections. Furthermore, a plurality of magnetizing coils 33a of a coil arrangement 33 and the like are shown in a simplified form.

As shown in FIGS. 4 and 5, the magnetizing device 30 includes a device upper unit (first magnetizing unit) 31 and a device lower unit (second magnetizing unit) 41. In order to enable installation and removal of the rotor 20, which is a magnetizing subject, the device upper unit 31 and the device lower unit 41 can be placed in contact with the rotor 20 and also can be placed away from the rotor 20. In this case, one or both of the device upper unit 31 and the device lower unit 41 are movable toward and away from the rotor 20.

The device upper unit 31 includes: an upper magnetizing yoke 32, which is made of magnetic metal; and the coil arrangement 33, which is integrally installed to the upper magnetizing yoke 32. The upper magnetizing yoke 32 includes a base 32a and eight opposing projections 32b. The base 32a is shaped in a circular ring plate form that has a diameter slightly larger than the rotor 20 which is the magnetizing subject. The opposing projections 32b are formed at a lower surface of the base 32a and are arranged at equal intervals in the circumferential direction. Each of the opposing projections 32b is configured to be placed in contact with or placed adjacent to an upper surface of the rotor 20, which is the magnetizing subject, and each of the opposing projections 32b is provided to a corresponding one of the rotor magnetic pole portions 26. Each of the magnetizing coils 33a of the coil arrangement 33 is wound around an outer peripheral surface 32c of a corresponding one of the opposing projections 32b. The number of the magnetizing coils 33a of the coil arrangement 33 is eight that is equal to the number of the opposing projections 32b.

Figures 6A, 6B:
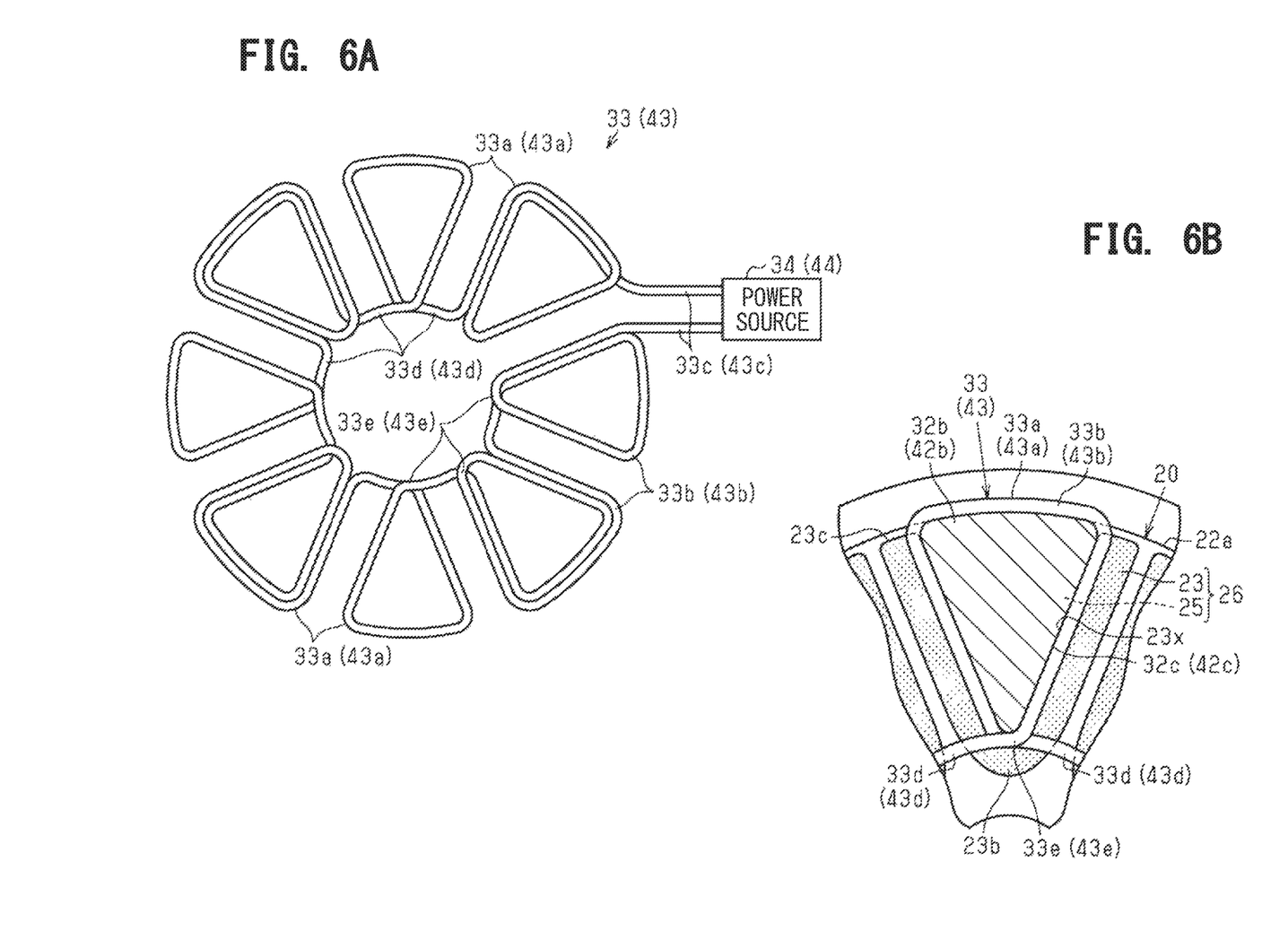
FIGS. 6A and 6B are explanatory diagrams for explaining a structure of a coil arrangement of the magnetizing device.

Each of the opposing projections 32b has a shape equivalent to that of the corresponding outer core portion 25, which is surrounded by the corresponding permanent magnet 23 having the V-shaped mountain fold at the rotor magnetic pole portion 26, in the view taken in the axial direction of the rotor 20 (see FIG. 6B). Specifically, each of the opposing projections 32b is shaped generally in a triangle that has an apex directed toward the center of the rotor 20. Furthermore, in the axial view, the outer peripheral surface 32c of the opposing projection 32b is formed to coincide with the magnet surface 23x of the permanent magnet 23, which is the V-shaped inner surface of the permanent magnet 23, and the outer peripheral surface 22a of the rotor core 22. Each of the opposing projections 32b may be slightly smaller than each of the outer core portions 25. With this configuration, a main magnetizing magnetic flux, which flows into or out of the opposing projection 32b, does not directly pass through an axial end surface of the permanent magnet 23 but passes from the outer core portion 25 along the magnet surface 23x of the corresponding permanent magnet 23 to magnetize the permanent magnet 23 in the direction of the thickness Wm (i.e., the thickness direction) of the permanent magnet 23 (see FIG. 2).

As shown in FIG. 6A, the coil arrangement 33 is formed as one system such that the coil arrangement 33 includes one conductor wire 33b that is wound by a predetermined number of times at the eight locations to form the eight magnetizing coils 33a, and a pair of connecting lines 33c at two opposite ends of the coil arrangement 33 are electrically connected to an electric power supply device (power source) 34. The coil arrangement 33 is shaped generally in a circular ring form arranged in the circumferential direction of the upper magnetizing yoke 32 and is installed to the opposing projections 32b which are arranged in the circumferential direction. The winding directions of magnetizing coils 33a of the coil arrangement 33 are alternately changed in the circumferential direction. Specifically, when the coil arrangement 33 is energized by the electric power supply device 34, the magnetizing coils 33a and the opposing projections 32b respectively wound with the associated magnetizing coils 33a are excited such that the polarities of the magnetizing coils 33a and the opposing projections 32b are alternately changed in the circumferential direction. The permanent magnets 23, which are magnetized by the magnetizing coils 33a and the opposing projections 32b, become the magnets that have the polarities which are alternately changed in the circumferential direction of the rotor 20.

Furthermore, as shown in FIGS. 6A and 6B, in the coil arrangement 33, each of a plurality of transition lines 33d, which connects between corresponding adjacent two of the magnetizing coils 33a in the circumferential direction, circumferentially extends between radially inner apexes of the corresponding adjacent two of the opposing projections 32b. Thereby, each of the transition lines 33d is configured to be as short as possible. Furthermore, each of a plurality of crossing points 33e of the conductor wire 33b wound to form the magnetizing coils 33a is a point, at which a part of the conductor wire 33b crosses another part of the conductor wire 33b in the corresponding one of the magnetizing coils 33a, and each crossing point 33e is positioned at the radially inner apex of the corresponding opposing projection 32b, i.e., is positioned to correspond to the bent portion 23b of the corresponding permanent magnet 23. The crossing point 33e of the conductor wire 33b at each of the magnetizing coils 33a is a point, at which disturbance on the magnetizing magnetic flux is likely to take place. Because of this reason, the crossing point 33e is positioned at the bent portion 23b, which is farthest from the stator 10 in the permanent magnet 23 and is less likely to have an influence on the magnetization of the permanent magnet 23 even upon the occurrence of the disturbance on the magnetizing magnetic flux.

The device upper unit 31 has the above-described structure, and the device lower unit 41 has the same structure as that of the device upper unit 31. Specifically, as shown in FIGS. 4 to 6B, the device lower unit 41 includes: a lower magnetizing yoke 42 that has eight opposing projections 42b at an upper surface of a base 42a; a coil arrangement 43 that has eight magnetizing coils 43a; and an electric power supply device 44 that is configured to energize the coil arrangement 43 while the lower magnetizing yoke 42, the coil arrangement 43 and the electric power supply device 44 correspond to the upper magnetizing yoke 32, the coil arrangement 33 and the electric power supply device 34 of the device upper unit 31. Each of the magnetizing coils 43*a* of the coil arrangement 43 is wound around an outer peripheral surface 42*c* of a corresponding one of the opposing projections 42*b*. The coil arrangement 43 is formed as one system such that the coil arrangement 33 includes one conductor wire 43*b* that is wound to form the magnetizing coils 43*a* while winding directions of magnetizing coils 43*a* are alternately changed in the circumferential direction, and a pair of connecting lines 43*c* at two opposite ends of the coil arrangement 43 are electrically connected to the electric power supply device 44 to electrically connect the conductor wire 43*b* to the electric power supply device 44. Like those of the device upper unit 31, a plurality of transition lines 43*d*, each of which connects between corresponding adjacent two of the magnetizing coils 43*a*, are positioned at a radially inner side location in the coil arrangement 43, and each of a plurality of crossing points 43*e* of the conductor wire 43*b* wound to form the magnetizing coils 43*a* is a point, at which a part of the conductor wire 43*b* crosses another part of the conductor wire 43*b* in the corresponding one of the magnetizing coils 43*a*, and each crossing point 43*e* is positioned at a radially inner apex of the corresponding opposing projection 42*b*.

At the time of magnetizing the rotor 20, the device upper unit 31 and the device lower unit 41 are opposed to the rotor 20, which is the magnetizing subject, in the axial direction, so that each of the opposing projections 32*b* of the device upper unit 31 and a corresponding one of the opposing projections 42*b* of the device lower unit 41 are opposed to the corresponding one of the opposing projections 42*b* of the device lower unit 41. When the energization by the respective electric power supply devices 34, 44 is executed, each opposing projection 32*b* and its associated magnetizing coil 33*a* of the device upper unit 31 and the opposite opposing projection 42*b* and its associated magnetizing coil 43*a* of the device lower unit 41, which are opposed to the opposing projection 32*b* and its associated magnetizing coil 33*a* described above in the axial direction, are excited to have a corresponding common polarity (corresponding one of the opposite polarities).

(Magnetizing Method of Permanent Magnets Using Magnetizing Device)

By using the magnetizing device 30 shown in FIGS. 4 to 6B, first of all, in an open state, in which the device upper unit 31 and the device lower unit 41 are spaced from each other, the rotor 20 having the unmagnetized permanent magnets 23, is installed between the device upper unit 31 and the device lower unit 41. After the installation of the rotor 20, which is the magnetizing subject, the device upper unit 31 and the device lower unit 41 are placed close to each other, so that each opposing projection 32*b* and the opposite opposing projection 42*b*, which are opposed to each other in the axial direction and will be magnetized to the common polarity, are placed in contact with or adjacent to the upper surface and the lower surface of the rotor 20.

Next, the coil arrangements 33, 43 are energized by the electric power supply devices 34, 44 of the device upper unit 31 and the device lower unit 41. The polarities of the opposing projections 32*b*, 42*b* of the device upper unit 31 and the device lower unit 41 are alternately changed in the circumferential direction through the energization of the magnetizing coils 33*a*, 43*a*. Furthermore, each opposing projection 32*b* (and each magnetizing coil 33*a*) of the device upper unit 31 and the opposite opposing projection 42*b* (and each magnetizing coil 43*a*) of the device lower unit 41, which are opposed to each other, are excited to have the corresponding common polarity.

As shown in FIG. 4, when the opposing projection 32*b* of the device upper unit 31 and the opposite opposing projection 42*b* of the device lower unit 41, which are axially opposed to each other, are excited to have the S-polarity (S-pole), the magnetizing magnetic flux, which flows in the direction (including the direction of the thickness Wm of the permanent magnet 23 shown in FIG. 2) that is perpendicular to the axial direction, is converted at the outer core portion 25 to magnetic fluxes, which respectively flow toward the opposing projection 32*b* and the opposite opposing projection 42*b* respectively located on the two opposite axial sides. Therefore, the permanent magnet 23 is magnetized to have the N-pole at the magnet surface 23*x* side of the permanent magnet 23. Furthermore, although not shown in the drawing, when the opposing projection 32*b* and the opposite opposing projection 42*b*, which are opposed to each other, are excited to have the N-polarity (N-pole), the magnetizing magnetic fluxes, which respectively flow out of the opposing projection 32*b* and the opposite opposing projection 42*b*, are converted to the magnetic flux that flows in the direction (including the direction of the thickness Wm of the permanent magnet 23) that is perpendicular to the axial direction, at the outer core portion 25. Therefore, the permanent magnet 23 is magnetized to have the S-pole at the magnet surface 23*x* side of the permanent magnet 23.

Furthermore, since each of the opposing projections 32*b*, 42*b* has the shape that corresponds to the shape of the outer core portion 25 surrounded by the permanent magnet 23 shaped in the form of the V-shaped mountain fold, the magnetizing magnetic flux, which flows into or out of each opposing projection 32*b*, 42*b*, does not directly pass through the axial end surface of the permanent magnet 23 but passes through the magnet surface 23*x* of the permanent magnet 23 after the flow direction of the magnetic flux is suitably converted from the axial direction to the direction perpendicular to the axial direction at the outer core portion 25. Therefore, the permanent magnet 23 has a magnetization mode where the permanent magnet 23 is easily magnetized in the direction of the thickness Wm (see FIG. 2). Furthermore, although each of the crossing points 33*e*, 43*e* of the conductor wire 33*b*, 43*b* wound to form the respective magnetizing coils 33*a*, 43*a* is the point, at which the disturbance on the magnetizing magnetic flux is likely to take place, this crossing point 33*e*, 43*e* is positioned at the radially inner apex of the corresponding opposing projection 32*b*, 42*b*, i.e., is positioned at the bent portion 23*b*, which is farthest from the stator 10 in the permanent magnet 23 and is less likely to have the influence on the magnetization of the permanent magnet 23 even upon the occurrence of the disturbance on the magnetizing magnetic flux.

Even in the case of the permanent magnet 23 of the present embodiment, which is shaped in the form of the generally V-shaped mountain fold, the magnetizing magnetic flux, which is suitable for the magnetization, can be supplied from the magnetizing device 30, which is arranged in the axial direction of the rotor 20, to the permanent magnet 23 throughout the entire range of the permanent magnet 23 that is from the radially outer end parts 23*c* to the bent portion 23*b* located at the radially inner side. Thus, more effective magnetization can be performed over the entire permanent magnet 23. In particular, like the permanent magnet 23 of the present embodiment, the magnetization is more effective in the case where the permanent magnet 23 is shaped in the form of the mountain fold where the insertion depth Lm is larger than the magnetic pole pitch Lp.

Figure 7:
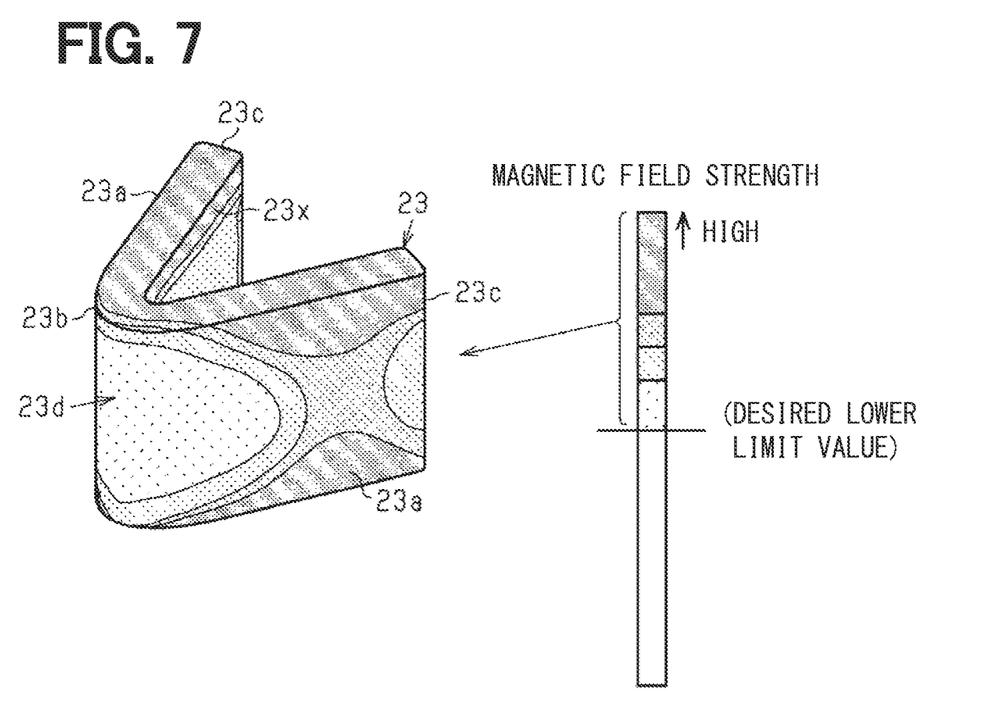
FIG. 7 is an explanatory diagram for explaining a permanent magnet magnetized by the magnetizing device of the one embodiment.

In the case of the permanent magnet that is magnetized by using the conventional ordinary magnetizing technique for magnetizing the magnet from the radially outer side of the rotor, the magnetic force tends to be weaker at and near the bent portion. In contrast, as shown in FIG. 7, in the case of the permanent magnet 23 that is magnetized by using the magnetizing technique of the present embodiment, the permanent magnet 23 can be magnetized with the sufficient magnetic field strength that exceeds a desired lower limit value even at the bent portion 23b and its vicinity. Even a center part 23d of the bent portion 23b, which is centered in an up-to-down direction and is difficult to magnetize, can be magnetized with a magnetic field strength exceeding the desired lower limit value. Therefore, in the permanent magnet 23 of the present embodiment, a percentage of the region, which is magnetized with the magnetic field strength exceeding the desired lower limit value, is about 95%, which is more than 90%. Thus, it is possible to magnetize the entire permanent magnet 23 with the sufficient magnetic force.

Next, advantages of the present embodiment will be described.

(1) When the permanent magnets 23, which are inserted in the rotor 20, are magnetized from the outside of the rotor 20 by using the magnetizing device 30, each opposing projection 32b of the device upper unit 31 and the opposite opposing projection 42b of the device lower unit 41, which are opposed to each other in the axial direction of the rotor 20, are excited to have the corresponding common polarity according to the energization of the respective magnetizing coils 33a, 43a to magnetize the corresponding permanent magnet 23. At this time, the magnetizing magnetic fluxes, which have the common polarity, are respectively supplied from the two opposite axial sides to the outer core portion 25 of the rotor core 22 which is located on the inner side of the mountain fold of the permanent magnet 23 in the circumferential direction and is on the radially outer side of the permanent magnet 23, and thereby the permanent magnet 23 is magnetized. Therefore, even in the case of the permanent magnet 23, which is shaped in the form of the mountain fold, the magnetizing magnetic flux, which is suitable for the magnetization, can be supplied to the permanent magnet 23 throughout the entire range of the permanent magnet 23 that is from the radially outer end parts 23c to the bent portion 23b located at the radially inner side. Thus, more effective and sufficient magnetization can be performed over the entire permanent magnet 23.

(2) In the view taken in the axial direction of the rotor 20, each projection 32b, 42b has the size that is equal to or slightly smaller than the size of the outer core portion 25 which is located on the inner side of the mountain fold of the permanent magnet 23 in the circumferential direction and is on the radially outer side of the permanent magnet 23. Therefore, since the magnetizing magnetic flux, which flows into or out of each opposing projection 32b, 42b, does not directly pass through the axial end surface of the permanent magnet 23 but is suitably converted at the outer core portion 25 to change the flow direction of the magnetic flux from the axial direction to the direction perpendicular to the axial direction, the permanent magnet 23 can be suitably magnetized in the direction of the thickness Wm.

(3) The transition lines 33d, 43d, each of which connects between the corresponding adjacent two of the magnetizing coils 33a, 43a, are positioned at the radially inner side location at the coil arrangement 33, 43. Therefore, it is possible to minimize the length of the conductor wire 33b, 43b that constitutes the coil arrangement 33, 43 including the transition lines 33d, 43d. When the length of the conductor wire 33b, 43b is reduced, the resistance of the conductor wire 33b, 43b is reduced. Therefore, the heat generation of the coil arrangement 33, 43 during magnetization can be limited, and thereby the productivity of the rotor 20 (including the productivity in the process of the magnetization of the rotor 20) can be improved.

(4) Each of the crossing points 33e, 43e of the conductor wire 33b, 43b wound to form the magnetizing coils 33a, 43a is positioned at the radially inner side location, i.e., is positioned at the bent portion 23b which is farthest from the stator 10 in the permanent magnet 23 and is less likely to have the influence on the magnetization of the permanent magnet 23. Therefore, even when the disturbance on the magnetizing magnetic flux occurs, it is possible to limit the influence on the magnetization of the permanent magnet 23.

The present embodiment may be modified as follows. The present embodiment and the following modification(s) may be implemented in combination within a technically consistent range.

In the above embodiment, each of the opposing projections 32b, 42b of the magnetizing device 30 has the shape that corresponds to the shape of the outer core portion 25 in the view taken in the axial direction of the rotor 20. Alternatively, each of the opposing projections 32b, 42b may have a shape, only a portion of which corresponds to the shape of the outer core portion 25, or a shape, which is different from the shape of the outer core portion 25.

Figure 8:
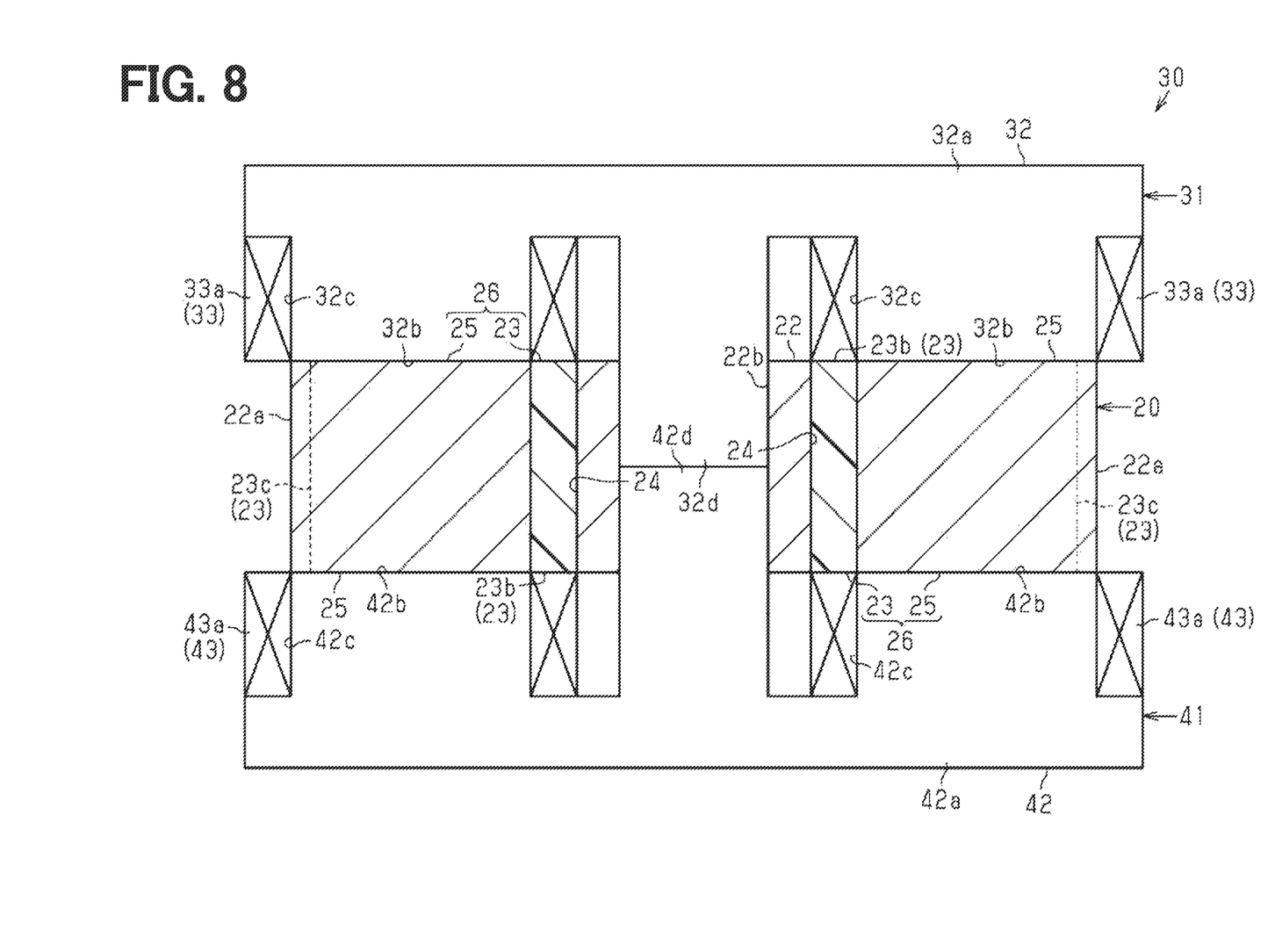
FIG. 8 is an explanatory diagram for explaining an overall structure of a magnetizing device of a modification.

As shown in FIG. 8, an inserting projection (serving as an inserting portion) 32d, 42d may be formed at a center of each of the upper magnetizing yoke 32 and the lower magnetizing yoke 42, and the magnetization may be executed after inserting the inserting projections 32d, 42d in the shaft fitting hole 22b formed at the center of the rotor 20, which is the magnetizing subject. By providing the inserting projections 32d, 42d, a portion of the magnetizing magnetic flux, which is generated in response to the excitation of the magnetizing coils 33a, 43a, is supplied to the inserting projections 32d, 42d, so that the amount of the magnetizing magnetic flux, which is conducted at the radially inner side of the rotor 20 can be increased. Therefore, the bent portion 23b and its vicinity of each permanent magnet 23 located at the radially inner side of the rotor 20 can be more effectively magnetized.

Figure 9:
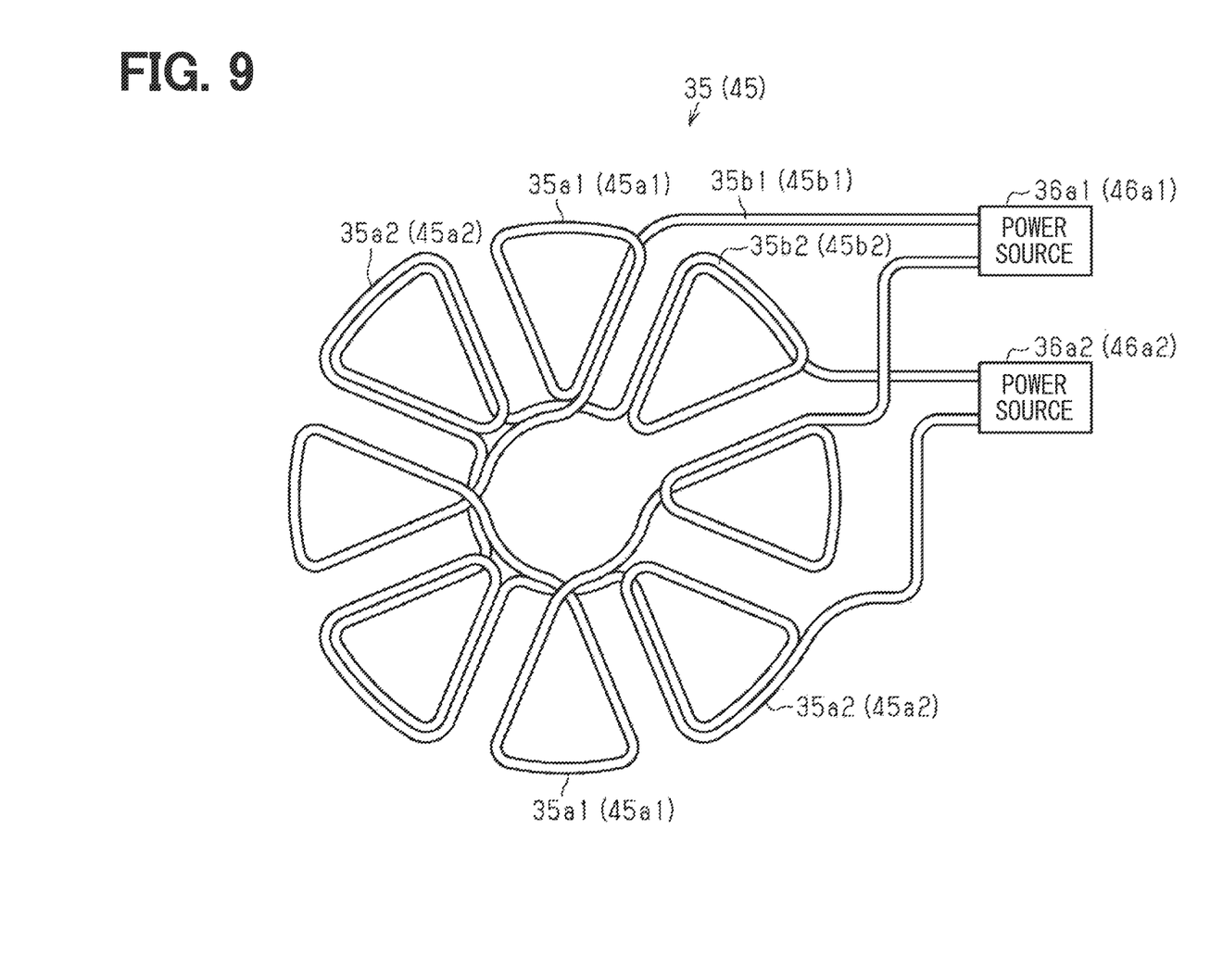
FIG. 9 is an explanatory diagram for explaining a structure of a coil arrangement of the magnetizing device of the modification.

Furthermore, in the modification shown in FIG. 8, as shown in FIG. 9, the coil arrangement 35 of the device upper unit 31 is divided into a plurality of primary magnetizing coils 35a1 of a first system, which are formed by one conductor wire 35b1 and are wound in one common direction, and a plurality of secondary magnetizing coils 35a2 of a second system, which are formed by one conductor wire 35b2 and are wound in an opposite common direction that is opposite to the one common direction, and the primary magnetizing coils 35a1 of the first system and the secondary magnetizing coils 35a2 of the second system are alternately arranged in the circumferential direction. Likewise, the coil arrangement 45 of the device lower unit 41 is divided into a plurality of primary magnetizing coils 45a1 of a first system, which are formed by one conductor wire 45b1 and are wound in one common direction, and a plurality of secondary magnetizing coils 45a2 of a second system, which are formed by one conductor wire 45b2 and are wound in an opposite common direction that is opposite to the one common direction, and the primary magnetizing coils 45a1 of the first system and the secondary magnetizing coils 45a2 of the second system are alternately arranged in the circumferential direction. Specifically, each coil arrangement 35, 45 is formed by the two systems, and these two systems are independent to each other and are provided to form the two opposite polarities, respectively, of the permanent magnets 23. A first electric power supply device 36a1, 46a1 is connected to the first system in each of the device upper unit 31 and the device lower unit 41, and a second electric power supply device 36a2, 46a2 is connected to the second system in each of the device upper unit 31 and the device lower unit 41. Furthermore, the process of the magnetization is divided into a first step using the first system of each of the device upper unit 31 and the device lower unit 41 and a second step using the second system of each of the device upper unit 31 and the device lower unit 41. In this way, each inserting projection 32d, 42d functions as one magnetic pole in each step. Therefore, the amount of the magnetizing magnetic flux, which passes the radially inner side of the rotor 20, can be further increased, and the magnetization of the bent portion 23b and its vicinity of each permanent magnet 23 can be further effectively performed.

In the above embodiment, the transition lines 33d, 43d, each of which connects between the corresponding adjacent two of the magnetizing coils 33a, 43a, are positioned at the radially inner side location of the coil arrangement 33, 43. Alternatively, the position of the transition lines 33d, 43d may be appropriately changed to another position, such as a radially outer side location of the coil arrangement 33, 43.

In the above embodiment, each of the crossing points 33e, 43b of the conductor wire 33b, 43b wound to form the magnetizing coils 33a, 43a is positioned at the radially inner side location. Alternatively, the position of each of the crossing points 33e, 43b may be appropriately changed to another position, such as a radially outer side location.

Figure 10:
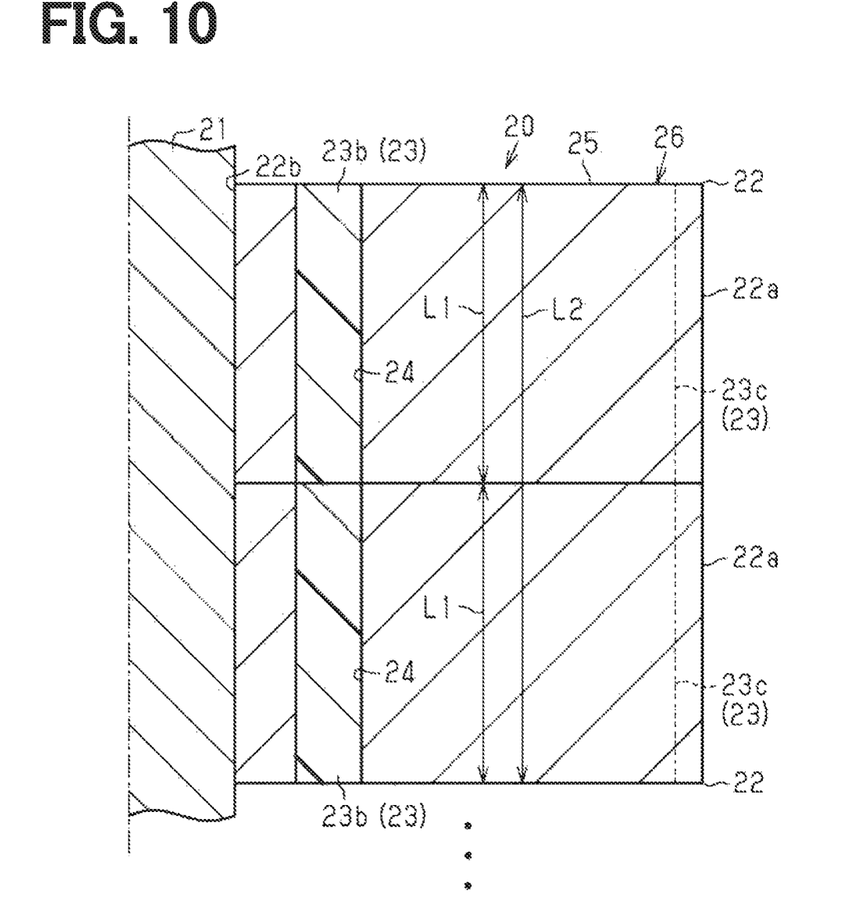
FIG. 10 is a cross-sectional view of a rotor of a modification including permanent magnets magnetized by a magnetizing device.

The magnetization of the permanent magnets 23 by the magnetizing device 30 is executed by supplying the magnetizing magnetic flux in the axial direction of the rotor 20. Therefore, in a case of magnetizing the rotor 20, which is relatively long in the axial direction, there is concern about whether a middle portion of each permanent magnet 23, which is positioned in the middle of the permanent magnet 23 in the axial direction, can be sufficiently magnetized. In such a case, as shown in FIG. 10, it is assumed that the axial length of the rotor 20, which allows the sufficient magnetization of the permanent magnets 23 by the magnetizing device 30, is L1. Here, a block of a magnetizing unit has an axial length that is equal to or less than L1. The rotor core 22, which has the magnetized permanent magnets 23, forms the block that is provided as one of a plurality (e.g., two, three or more) of blocks, and these blocks are stacked in the axial direction to form the rotor 20 that has an axial length L2 which is longer than L1. Even if the axial length is L2 that exceeds L1, the permanent magnets 23 are sufficiently magnetized in each of the blocks. Therefore, the rotor 20, which includes the permanent magnets 23 each having the sufficient magnetic force, can be formed.

In the above embodiment, the magnetizing device 30 includes the device upper unit 31, which is placed at the upper side, and the device lower unit 41, which is placed at the lower side. However, the structure of the magnetizing device 30 is not limited to this. The device upper unit 31 and the device lower unit 41 may be arranged side by side in a horizontal direction or an inclined direction that is other than the up-to-down direction.

The shape of the permanent magnet 23 shown in FIGS. 2 and 7 is the one example and may be appropriately changed.

The structure of the rotary electric machine M shown in, for example, FIG. 1 is the one example and may be appropriately changed.

Although the present disclosure has been described with reference to the embodiment and the modifications, it is understood that the present disclosure is not limited to the embodiment and the modifications and structures described therein. The present disclosure also includes various variations and variations within the equivalent range. Also, various combinations and forms, as well as other combinations and forms that include only one element, more, or less, are within the scope and ideology of the present disclosure.

What is claimed is:

1. A manufacturing device for a rotor, the manufacturing device comprising:
   a magnetizing device that is configured to magnetize, from an outside of the rotor, a permanent magnet of the rotor, the permanent magnet being inserted in a magnet receiving hole of a rotor core of the rotor and being shaped as a mountain fold that is convex toward a radially inner side, wherein:
   the magnetizing device includes:
      a first magnetizing unit that includes a magnetizing coil which is configured to supply a magnetizing magnetic flux to the permanent magnet when the first magnetizing unit is placed on one side of the rotor in an axial direction of the rotor; and
      a second magnetizing unit that includes a magnetizing coil which is configured to supply a magnetizing magnetic flux to the permanent magnet when the second magnetizing unit is placed on another side of the rotor in the axial direction; and
   the magnetizing device is further configured so that, at a time of energization of the magnetizing coil of the first magnetizing unit and energization of the magnetizing coil of the second magnetizing unit, a corresponding portion of the first magnetizing unit and a corresponding portion of the second magnetizing unit, which are opposed to the rotor in the axial direction, are respectively excited to have a common polarity and thereby to supply the magnetizing magnetic flux, which has the common polarity, from the one side and the another side in the axial direction to a corresponding portion of the rotor core, which is located on an inner side of the mountain fold of the permanent magnet, to magnetize the permanent magnet.

2. The manufacturing device for the rotor according to claim 1, wherein:
   the first magnetizing unit includes an opposing projection that has an outer peripheral surface, around which the magnetizing coil of the first magnetizing unit is wound to supply the magnetizing magnetic flux, and the second magnetizing unit includes an opposing projection that has an outer peripheral surface, around which the magnetizing coil of the second magnetizing unit is wound to supply the magnetizing magnetic flux; and
   in a view taken in the axial direction, the opposing projection of the first magnetizing unit and the opposing projection of the second magnetizing unit respectively have a size that is equal to or smaller than a size of the corresponding portion of the rotor core.

3. The manufacturing device for the rotor according to claim 1, wherein:
   in each of the first magnetizing unit and the second magnetizing unit, the magnetizing coil is one of a plurality of magnetizing coils which are formed by a coil arrangement and are arranged in a circumferential direction; and in each of the first magnetizing unit and the second magnetizing unit, a plurality of transition lines, each of which connects between corresponding adjacent two of the plurality of magnetizing coils, are respectively positioned at a radially inner side location at the coil arrangement.

4. The manufacturing device for the rotor according to claim 1, wherein:

in each of the first magnetizing unit and the second magnetizing unit, the magnetizing coil is one of a plurality of magnetizing coils which are formed by a coil arrangement and are arranged in a circumferential direction; and in each of the first magnetizing unit and the second magnetizing unit, each of a plurality of crossing points, at which a part of a conductor wire of the coil arrangement wound to form the plurality of magnetizing coils crosses another part of the conductor wire in a corresponding one of the plurality of magnetizing coils, is positioned at a radially inner side location of the coil arrangement.

5. The manufacturing device for the rotor according to claim 1, wherein:

each of the first magnetizing unit and the second magnetizing unit includes an inserting portion which is configured to be inserted in a shaft fitting hole of the rotor; and each of the first magnetizing unit and the second magnetizing unit is configured to conduct a portion of the magnetizing magnetic flux through the inserting portion in response to excitation of the magnetizing coil.

6. The manufacturing device for the rotor according to claim 1, wherein:

the permanent magnet is one of a plurality of permanent magnets;

in each of the first magnetizing unit and the second magnetizing unit, the magnetizing coil is one of a plurality of magnetizing coils that are divided into:

one or more magnetizing coils of a first system for magnetizing one or more of the plurality of permanent magnets into one of two opposite polarities; and one or more magnetizing coils of a second system for magnetizing one or more of the plurality of permanent magnets to another one of the two opposite polarities; and the first magnetizing unit and the second magnetizing unit are respectively configured to separately execute:

a magnetizing process of the first system through energization of the one or more magnetizing coils of the first system; and a magnetizing process of the second system through energization of the one or more magnetizing coils of the second system.

7. The manufacturing device for the rotor according to claim 1, wherein:

the permanent magnet forms a block of a magnetizing unit; and the rotor includes the block as one of a plurality of blocks that are stacked in the axial direction.

8. A method of manufacturing a rotor using the manufacturing device of claim 1, the manufacturing method comprising:

magnetizing a permanent magnet of the rotor, which is inserted in a magnet receiving hole of a rotor core of the rotor and is shaped as a mountain fold that is convex toward a radially inner side, from an outside of the rotor by using the magnetizing device of the manufacturing device, wherein:

the magnetizing of the permanent magnet includes:

placing the first magnetizing unit of the magnetizing device on one side of the rotor in an axial direction of the rotor;

placing the second magnetizing unit of the magnetizing device on another side of the rotor in the axial direction; and at a time of energization of the magnetizing coil of the first magnetizing unit and energization of the magnetizing coil of the second magnetizing unit, exciting the corresponding portion of the first magnetizing unit and the corresponding portion of the second magnetizing unit, which are opposed to the rotor in the axial direction, so that the corresponding portion of the first magnetizing unit and the corresponding portion of the second magnetizing unit have a common polarity and thereby respectively supply a magnetizing magnetic flux, which has the common polarity, from the one side and the another side in the axial direction to a corresponding portion of the rotor core, which is located on an inner side of the mountain fold of the permanent magnet, to magnetize the permanent magnet.

\* \* \* \* \*